Jan. 15, 1946.    R. E. EGGERT    2,393,030
NUT FOR THREADLESS STUDS AND THE LIKE
Filed Nov. 29, 1944    2 Sheets-Sheet 1
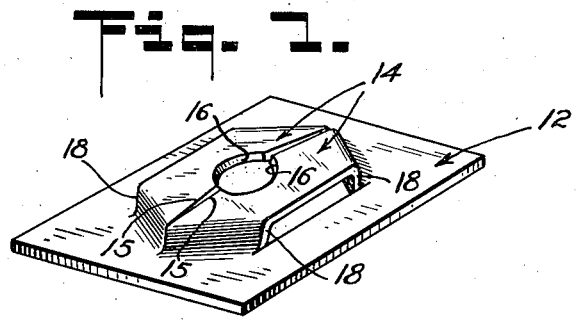
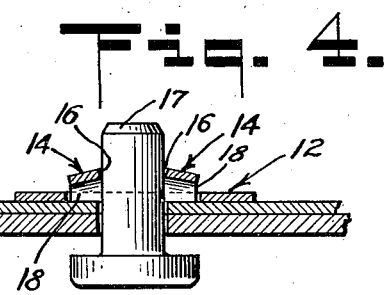
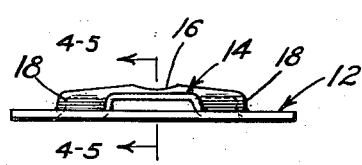
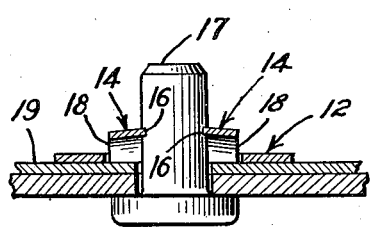
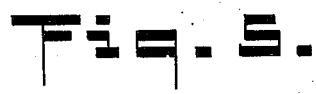
Inventor
RONALD E. EGGERT
By
Attorney Jan. 15, 1946.  R. E. EGGERT  2,393,030
NUT FOR THREADLESS STUDS AND THE LIKE
Filed Nov. 29, 1944  2 Sheets-Sheet 2

Inventor
RONALD E. EGGERT
By R. S. Berry
Attorney

Patented Jan. 15, 1946

2,393,030

UNITED STATES PATENT OFFICE 2,393,030

NUT FOR THREADLESS STUDS AND THE LIKE

Ronald Edgar Eggert, Burbank, Calif., assignor to Adel Precision Products Corp., a corporation of California Application November 29, 1944, Serial No. 565,714

11 Claims. (Cl. 85—36)

This invention relates to nut-like fastenings of the resilient sheet metal type in which a body portion is formed with outwardly struck portions lying side by side in offset relation to the body portion for engaging a bolt or screw to hold the nut thereon, and more particularly pertains to a fastening or nut which is especially constructed and arranged for holding in place a threadless fastening element such as a stud, rivet pin or the like.

An object of the present invention is to provide a nut-like fastening such as described in which a sheet metal body portion is formed with outwardly struck resilient portions constructed and arranged to encompass, bite into and securely hold in place under tension a threadless stud or the like element incident to the forcing of nut onto such stud or like element, or to the insertion of the stud pin or like element through the nut, the said offset portions acting to increasingly bite into and grip such stud or like element when a force is applied to separate the latter from the nut.

A further object is to provide a fastening such as described in which the outwardly offset portions for gripping the threadless stud or the like, are formed as arches joined at their ends to the body portion of the fastening by means of bends or web portions which extend at acute angles to the edges of said portions so that said portions will flex in a manner assuring a tight gripping of the threadless stud or like member to which the fastening is applied.

Another object is to provide a fastening such as described which may be embodied in an elongated resilient body with the outwardly struck portions disposed in inwardly spaced relation to the side and end edges of the body to provide a rectangular seating frame around such portion adapted to seat on the member against which the fastening rests, or may have the outwardly offset portions occupy all of the area of such a body portion except the ends of the latter, thereby making a bridge or arch formation of the body portion itself between such ends and increasing the spring action of the fastening as a whole.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a perspective view of a nut embodying this invention;

Fig. 2 is a top plan view of the nut;

Fig. 3 is a side elevation of the nut;

Fig. 4 is a sectional view on the line 4—4 of Fig. 3, showing the nut as when applied to a threadless stud, rivet, pin or the like before the stud is fully inserted.

Fig. 5 is a sectional view corresponding to Fig. 4 but showing the nut and stud as when tightened and in final holding position;

Figure 6:
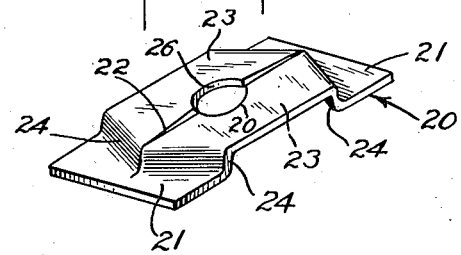
Fig. 6 is a perspective view of a modified form of nut embodying this invention.
Figure 7:
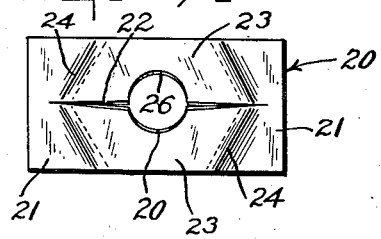
Fig. 7 is a top plan view of the nut shown in Fig. 6.
Figure 9:
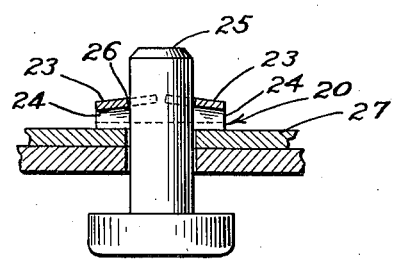
Fig. 9 is a sectional view taken on the line 9—9 of Fig. 8 showing the nut as when applied to a stud and before the stud is pushed into place or tightened.
Figure 8:
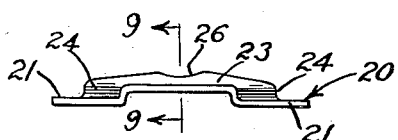
Fig. 8 is a side elevation of the nut shown in Fig. 6.

Referring more specifically to the drawings, particularly Figs. 1 to 5, inclusive, it is seen that one embodiment of my invention comprises an elongated resilient sheet metal body portion 12 having like elongated resilient arch or bridge portions 14 struck outwardly therefrom and lying side by side in correspondingly offset relation to the plane of the body portion with their longitudinal edges 15 opposed and provided with complementary arcuate edge portions 16 defining an opening for reception of a threadless stud or like element 17. This opening is somewhat smaller in diameter than the stud so that the arcuate edges 16 will be spread apart upon the forcing of the stud therebetween and therefore will bite into and tightly grip the stud under spring tension as shown in Fig. 5 so as to securely hold the stud in place and prevent dislodgement of the nut.

The arch portions 14 are transversely inclined from their edges 15 toward their outer edges and are therefore somewhat canted transversely so as to more readily flex or bow inwardly against the stud. Moreover this inclination disposes the arcuate portions 16 at such angles to the axis of the stud that sharp edges thereof are presented against the stud and will therefore tightly grip and bite into the stud.

As here shown the arch or bridge portions 14 are joined to the body portion 12 by means of bends or webs 18 projecting substantially right angularly outwardly from the plane of the body portion 12 and extending at acute angles to the longitudinal axes of said bridge portions, thereby giving each bridge portion a trapezoidal outline and forming of the two bridges a hexagonal protuberance surrounded by a rectangular frame which is that portion of the body not struck outwardly in forming the bridge portions. This frame-like body portion will rest on the member 19 against which the nut abuts as shown in Figs. 4 and 5, whereas the bridge portions will be outwardly spaced from the member 19. The diagonal bends or webs 18 make for a stronger fastening as a whole than would be the case if the bends were at right angles to said bridge portions and also cause said bridge portions to flex or bow inwardly toward the stud, in directions which are normal to the bends as indicated by the small arrows in Fig. 2.

As the nut hereof is forced onto the stud, as shown in Fig. 4, the bridge portions 14 are spread apart somewhat due to the opening between the arcuate edges 16 being smaller than the stud. This causes said edges to tightly grip the stud. However, in placing the nut on the stud the bridge portions will yield outwardly, allowing the nut to be readily pushed the full extent onto the stud with the arcuate edges 16 angularly engaged with the stud as shown in Fig. 4. Should a force be applied tending to separate the nut and stud, that is, to cause the nut to slip outwardly on the stud, the bridge portions will bow or flex in such manner due to the angle of the bends 18, as to bite deeper into the stud as shown in Fig. 5 thereby positively locking the stud in place.

In setting the nut it is forced under pressure against the member 19 which it abuts as shown in Fig. 5, so that the arch or bridge portions 14 will be bowed and have a tensioned frictional engagement with and bite into the stud. This locking action may also be effected by holding the nut against the member 19 and forcing the stud tightly in place, there being in either case a tensioned frictional gripping of the stud by the resilient bridge portions 14 and a biting of the angularly disposed edges 16 into the stud such that the stud is securely held in place.

It should be noted that the nut hereof has its bridge portions, that is, its stud gripping edges 16, in substantially the same plane in contradistinction to similar fastenings which require an angular disposition of such edges in different planes in order to have screw threaded engagement with a threaded member such as a bolt or screw.

Referring to Figs. 6 to 10 inclusive, it is seen that a modified form of the invention comprises an elongated resilient sheet metal body portion 20 which is narrower than the body portion shown in Figs. 1 to 5 and therefore provides for a narrower nut and uses less material than the nut shown in Figs. 1 to 5.

In this form all of the body portions lying between substantially coplanar end portions 21, are formed as an arch or bridge divided by a longitudinal slit 22 to form side by side arch portions 23 corresponding to the arch portions 14. These portions 23 are of like outward extent and joined by webs or bends 24 in the same manner as are the portions 14 shown in Figs. 1 to 5, said bends extending at acute angles to the longitudinal axes of said arch portions.

The opening for the stud 25 is formed by arcuate edge portions 26 which are identical with the edge portions 16. In all other respects this form of nut is the same construction and arrangement as that shown in Figs. 1 to 5.

Figure 10:
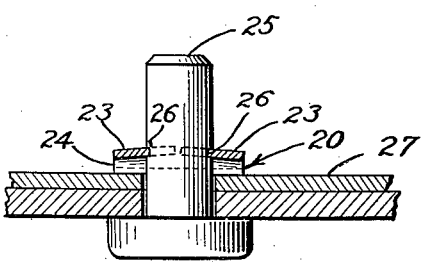
Fig. 10 is a view similar to Fig. 9 showing the nut as when the stud is in place.

This modified form of nut is applied in the same manner as the nut shown in Figs. 1 to 5, except that the ends 21 only rest on the member 27 through which the stud passes, the entire part of the body portion between said ends being spaced outwardly from said member but being subject to being bowed or flexed relative thereto. Fig. 10 shows how this form of nut will bite into the stud and lock the stud in place and indicates how any force tending to separate the nut and stud will cause the nut to increasingly resist such separation by biting deeper into the stud.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a nut for threadless studs or the like, a body portion having outwardly struck elongated resilient arch portions lying side by side between and outwardly offset from opposite ends of the body portion, said arch portions having free longitudinal margins and being formed integral only at their ends with said opposite ends of the body portion, and opposed substantially coplanar stud-engaging edges intermediate the ends of said arch portions adapted to receive between them and frictionally grip a threadless stud or the like.

2. In a nut for threadless studs or the like, a body portion having integral outwardly struck elongated resilient arch portions lying side by side between and outwardly offset from opposite ends of the body portion, and stud-engaging edges intermediate the ends of said arch portions adapted to receive between them and frictionally grip a threadless stud or the like, said arch portions being inclined transversely thereof from their opposed to their outer edges whereby said opposed stud-engaging edges are angularly disposed for a biting contact with said stud, said outer edges extending in substantial parallelism with said inner edges and being offset from the plane of the ends of the body portion.

3. In a nut for threadless studs or the like, a body portion having integral outwardly struck elongated resilient arch portions lying side by side between and outwardly offset from opposite ends of the body portion, and opposed substantially coplanar stud-engaging edges intermediate the ends of said arch portions adapted to receive between them and frictionally grip a threadless stud or the like, each of said bridge portions being of substantially a trapezoidal shape and having its outer longitudinal edge separated from the body portion by a slit.

4. In a nut for threadless studs or the like, a body portion having integral outwardly struck elongated resilient arch portions lying side by side between and outwardly offset from opposite ends of the body portion, and opposed substantially coplanar stud-engaging edges intermediate the ends of said arch portion adapted to receive between them and frictionally grip a threadless stud or the like, said arch portions forming a substantially hexagonal protuberance on one side the body portion with their outer longitudinal margins offset from the plane of the body portion.

5. In a nut for threadless studs or the like, a body portion having integral outwardly struck elongated resilient arch portions lying side by side between and bodily outwardly offset from opposite ends of the body portion with their longitudinal edges free and their ends only joined to said ends of the body portion, and opposed substantially coplanar stud-engaging edges intermediate the ends of said arch portions adapted to receive between them and frictionally grip a threadless stud or the like, said arch portions being oppositely inclined transversely thereof to dispose said stud-engaging edges so as to bite into the stud.

6. In a nut for threadless studs or the like, a body portion having integral outwardly struck elongated resilient arch portions lying side by side between and outwardly offset from opposite ends of the body portion with their longitudinal edges free, and opposed substantially coplanar stud-engaging edges intermediate the ends of said arch portions adapted to receive between them and frictionally grip a threadless stud or the like, said body portion forming a frame surrounding said arch portions and adapted to seat on a member through which the stud is extended for engagement with the nut.

7. In a nut for threadless studs or the like, a body portion having integral outwardly struck elongated resilient arch portions lying side by side between and outwardly offset from opposite ends of the body portion, and opposed substantially coplanar stud-engaging edges intermediate the ends of said arch portions adapted to receive between them and frictionally grip a threadless stud or the like, said arch portions comprising all of that part of the body portions between said opposite ends of the body portion.

8. In a nut for threadless studs or the like, a body portion having integral outwardly struck elongated resilient arch portions lying side by side between and outwardly offset from opposite ends of the body portion, and opposed substantially coplanar stud-engaging edges intermediate the ends of said arch portions adapted to receive between them and frictionally grip a threadless stud or the like, said arch portions having a combined width equal to that of the body portion between said opposite ends.

9. In a nut for a threadless stud or the like, a resilient body, and stud gripping portions struck out from said body so as to lie in side by side relation and offset from the plane of the body with opposed side edges thereof spaced apart and formed with coacting stud-engaging edges, said stud gripping portions being inclined so that outer edges are nearer to the plane of the body than their opposed edges and separated from the body by longitudinal slits.

10. In a nut for a threadless stud, a plate-like body portion, and bridge members struck out from the plane of the body portion in side by side relation with the ends thereof only in integral formation with the body portion along lines which are diagonal with relation to said bridge portions, said bridge portions having opposed edge portions constructed and arranged to receive and grip a stud inserted therebetween, said bridge portions being transversely inclined so that their outer edges are nearer to the plane of the body portion than their opposed edges, both the outer and opposed edges of said bridge members being free whereby said members are bodily yieldable between their ends.

11. In a nut for a threadless stud, a plate-like body portion and bridge members struck out from the plane of the body portion in side by side relation with the ends thereof only in integral formation with the body portion, said bridge portions having portions of the inner edges thereof constructed and arranged to receive and grip therebetween a threadless stud, said bridge portions being transversely inclined between their ends so that their inner edges are offset from the plane of the body portion a greater extent than said outer edges, both the inner and outer edges of said bridge portions being free whereby the bridge portions are bodily yieldable except at the points of continuity of the ends thereof with said body portion.

RONALD EDGAR EGGERT.